US011106672B2

United States Patent
Liu et al.

(10) Patent No.: US 11,106,672 B2
(45) Date of Patent: Aug. 31, 2021

(54) QUERIES BASED ON RANGES OF HASH VALUES

(71) Applicant: ENTIT Software LLC, Sunnyvale, CA (US)

(72) Inventors: Rui Liu, Sunnyvale, CA (US); Qiming Chen, Sunnyvale, CA (US); Jeff Lefevre, Sunnyvale, CA (US); Malu G. Castellanos, Sunnyvale, CA (US); Meichun Hsu, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 729 days.

(21) Appl. No.: 15/762,586

(22) PCT Filed: Sep. 25, 2015

(86) PCT No.: PCT/US2015/052277
§ 371 (c)(1),
(2) Date: Mar. 23, 2018

(87) PCT Pub. No.: WO2017/052600
PCT Pub. Date: Mar. 30, 2017

(65) Prior Publication Data
US 2018/0268030 A1    Sep. 20, 2018

(51) Int. Cl.
*G06F 16/24* (2019.01)
*G06F 16/2453* (2019.01)
(Continued)

(52) U.S. Cl.
CPC .... *G06F 16/24542* (2019.01); *G06F 16/2255* (2019.01); *G06F 16/2471* (2019.01); *G06F 16/256* (2019.01); *G06F 16/27* (2019.01)

(58) Field of Classification Search
CPC ............................ G06F 16/27; G06F 16/24542
See application file for complete search history.

(56) References Cited

U.S. PATENT DOCUMENTS 9,235,611 B1 * 1/2016 Murray ................. G06F 16/278
9,471,657 B1 * 10/2016 Xiao ....................... G06F 16/27
(Continued)

FOREIGN PATENT DOCUMENTS

WO    WO-2013009503    1/2013

OTHER PUBLICATIONS

Https://www.usenix.org/system/files/conference/nsdi12/nsdi12-finai98.pdf Author:Jiaxing Zhang, Hucheng Zhou, Rishan Chen, Xuepeng Fan, Zhenyu Guo, Haoxiang Lin, Jack Y. Li. Wei Lin Jingren Zhou Lidong Zhou; Title:Optimizing Data Shuffling in Data-parallel Computation by Understanding User-defined Functions Date:Mar. 16, 2012.

(Continued)

*Primary Examiner* — Mohammad S Rostami

(57) ABSTRACT

A system includes a database client, and a distributed database comprising database nodes. The distributed database may receive a database query from the client, determine that the query comprises a range of hash values of a table partition stored by a node of the distributed database, and determine that the range of hash values is not stored by other nodes of the distributed database. Responsive to determining that the range of hash values of the query is stored by the node and not by the other nodes, the database may generate an optimized distributed execution plan that includes the node that stores the range of hash values and excludes the nodes that do not include the range of hash values.

17 Claims, 4 Drawing Sheets

(51) Int. Cl.
 *G06F 16/27* (2019.01)
 *G06F 16/22* (2019.01)
 *G06F 16/2458* (2019.01)
 *G06F 16/25* (2019.01)

(56) References Cited

U.S. PATENT DOCUMENTS

| | | | | |
|---|---|---|---|---|
| 2006/0218123 | A1* | 9/2006 | Chowdhuri | G06F 16/24532 |
| 2008/0215544 | A1* | 9/2008 | Galindo-Legaria | ............... |
| | | | | G06F 16/2452 |
| 2008/0306920 | A1 | 12/2008 | Santosuosso | |
| 2010/0205588 | A1* | 8/2010 | Yu | G06F 8/4441 |
| | | | | 717/149 |
| 2011/0010578 | A1* | 1/2011 | Ag ndez Dominguez | ............... |
| | | | | H04L 67/1065 |
| | | | | 714/4.1 |
| 2012/0096001 | A1* | 4/2012 | Zhou | G06F 16/90339 |
| | | | | 707/737 |
| 2012/0330954 | A1* | 12/2012 | Sivasubramanian | ............... |
| | | | | G06F 16/2228 |
| | | | | 707/737 |
| 2013/0191369 | A1 | 7/2013 | Barsness et al. | |
| 2014/0280021 | A1 | 9/2014 | Singamshetty | |
| 2014/0304294 | A1* | 10/2014 | Sharma | G06F 16/24539 |
| | | | | 707/769 |
| 2014/0379692 | A1 | 12/2014 | Teletia et al. | |
| 2015/0149435 | A1 | 5/2015 | McKenna et al. | |
| 2015/0227535 | A1* | 8/2015 | Avati | G06F 16/137 |
| | | | | 707/741 |
| 2016/0323385 | A1* | 11/2016 | Wang | G06F 16/2471 |

OTHER PUBLICATIONS https://www-01.ibm.com/support/knowledgecenter/ssw_ibm_i__72/ddp/rbal1pdf.pdf Date: Mar. 21, 2015; Title: Database Distributed Database Programming.

* cited by examiner

QUERIES BASED ON RANGES OF HASH VALUES

BACKGROUND

A computing system may execute a distributed database. The database may comprise a table. The distributed database may include a plurality of nodes. Each of the nodes may store a partition of the table.

BRIEF DESCRIPTION OF THE DRAWINGS

The following detailed description references the drawings, wherein.

DETAILED DESCRIPTION

Figure 1:
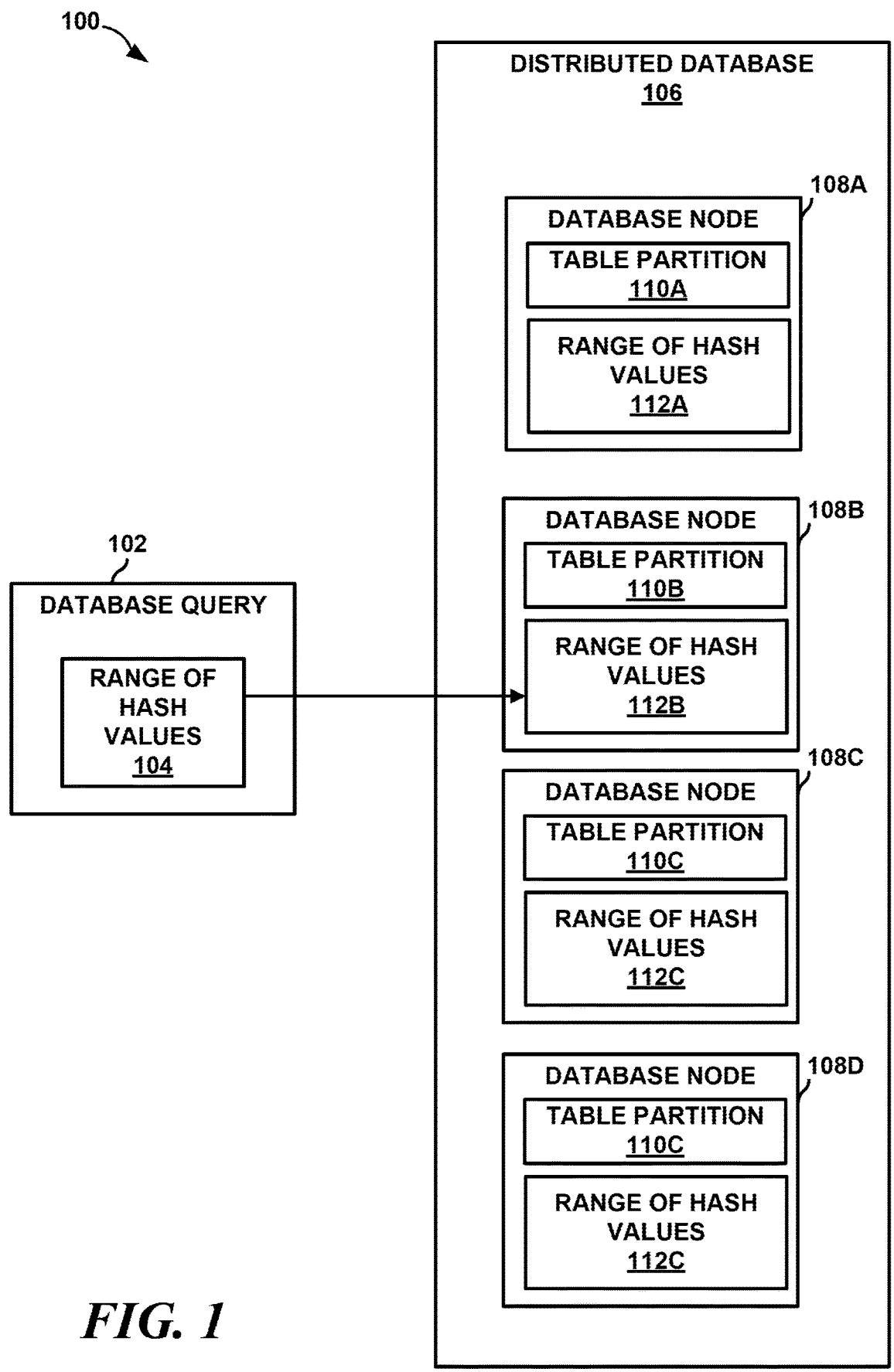
FIG. 1 is a conceptual diagram of an example of a distributed database to execute a query based on a range of hash values.

Distributed databases A computing system may execute a distributed database. The database may store a table comprising a plurality of entries across the nodes of the distributed database. More particularly, each of the nodes may store a partition of a table. Each partition of the table stores a portion of the entries that makeup the entire table.

A client may connect to the distributed database nodes. A client of the distributed database may generate a query, such as a structured query language (SQL) query. The client may transmit the query to the database using a database connection. The database may generate an optimized global execution plan comprising a tree-like data structure that can be converted to a physical execution plan, which a database node is capable of executing on its data.

a tree-like data structure, and may send out a distributed execution plan to each of the nodes for execution. Each node that executes the query does so on the partition of the table stored locally on that particular node, rather than on the entire table. Thus, by partitioning a database table across multiple nodes, and executing the distributed execution plan in parallel against each table partition, execution time can be reduced, and database throughput may be increased relative to a non-distributed database.

A distributed database may interface with a cluster of computing nodes that executed distributed computing framework in various examples. The distributed computing framework, such as Apache Spark, may generate tasks, which a distributed computing node may process. These tasks may process data that is loaded from a distributed database, such as a Vertica distributed database.

Loading data from the distributed database is referred to as "data loading." Each task on a node executing the computing framework may issue a database requested for data using a database query (e.g., a SQL query) to a node of the distributed database. The tasks may use a database connectivity technology, such as JDBC (Java Database Connectivity) to establish a connection to the distributed database. The tasks may begin processing once the tasks begin receiving data from the distributed database, and the tasks have access to the requested data.

In various examples, the node of the distributed database that receives the database query may be referred to as an "initiator" node. Responsive to receiving the database query, the initiator node may generate an optimized global execution plan. The global execution may comprise a tree-like data structure, with a choice of operators and execution order, which a database node may execute more quickly, for example. Based on the global execution plan, the initiator node may further generate distributed execution plans for each of the other nodes within the distributed database to execute, as well as a distributed execution plan for the initiator node to execute.

The module of a database node that executes distributed execution plan may be referred to as the "executor." The executor of the initiator node may execute a distributed execution plan, and the executors of the other nodes may execute their respective distributed execution plans. The other nodes transmit the results of executing their distributed execution plans to the initiator node via a network connection. The executor of the initiator node then combines the results of executing its distributed execution plan and the results of the other distributed execution plans, and transmits the results to the client device, e.g. a distributed computing framework task.

To increase execution throughput, computing framework tasks may issue parallel queries to the distributed database nodes. For example, if a distributed database comprises four nodes, four distributed computing tasks may each issue a single query, totaling four queries (one from each task). Each task may issue a query one of the four database nodes such that each database node receives one of the four queries.

In this example, each of the four nodes acts as an initiator node, and generates distributed execution plans for each of the three other nodes as well as itself. In the four node example, each of the four initiator nodes (i.e. each node that receives a query), generates four distributed execution plans, and executes one of the four distributed execution plans. Thus, the four distributed database nodes would execute a total of 16 distributed execution plans.

Each of the distributed execution plans transmitted from the initiator node to the non-initiator database nodes may request the same data as the data requested from the initiator node. Because each of the distributed execution plans request the same data, many of the distributed execution plans executed by the non-initiator database nodes may be redundant. Each of the unnecessary queries or distributed execution plans result in wasted processor utilization. Additionally, transmitting the results of the sub-execution plans to the initiator nodes consumes large amounts of bandwidth. Bandwidth consumption resulting from non-initiator nodes returning distributed execution plan results, referred to as data shuffling, may limit database throughput in many cases. For example, data shuffling may consume three fourths (75%) of network bandwidth.

Many distributed databases assign entries to a particular partition using a distributed hash table (DHT). The DHT uses a hash function to spread entries of a table evenly across the nodes of a distributed database. Each node is typically assigned a range of hash values. Upon storing a new value, a database node creates a hash value of the value to be stored using the hash function. The entry is stored in one of the database nodes based on the range of hash values into which the hash value falls. Thus, the hash function provides a way to quickly determine which node contains a particular hash value. If the hash value of an entry falls within the hash range associated with a particular node, that node contains the entry.

The techniques of this disclosure reduce both processor utilization resulting from redundant and/or unnecessary distributed execution plans, as well as the bandwidth consumption caused by transmitting redundant distributed execution plan results to an initiator node. The techniques of this disclosure reduce bandwidth and processor utilization by generating and determining queries that have a range of hash values matching the range of hash values of a table partition stored by a particular database node.

The techniques of this disclosure involve generating a query comprising a range of hash values of table partition stored by a particular node and not stored by other nodes of a distributed database. An initiator node that receives a query comprising the range of hash values may be the node storing the table partition having the range of hash values included in the query. The initiator node may also determine that the initiator node stores table partition having the range of hash values.

The initiator node may also determine that the range of hash values is not stored by other nodes of the distributed database. Responsive to determining that the range of hash values of the query is stored by the initiator node and not by the other nodes, the initiator node may generate an optimized distributed execution plan. The optimized distributed execution plan may include the initiator node that stores the range of hash values and may exclude the nodes that do not include the range of hash values. An executor module of the initiator node may then execute the optimized distributed execution plan on the table partition stored by the node. The other nodes may not execute the distributed execution plan, i.e. there may be no distributed execution plan for the other nodes.

By determining that the other nodes do not store the table partition associated with the range of hash values, the initiator node can avoid sending a distributed execution plan to the other database nodes. Thus, the other nodes do not spend processor time executing unnecessary distributed execution plans. Moreover, the other nodes do not consume bandwidth returning redundant or unnecessary query results to the initiator node.

FIG. 1 is a conceptual diagram of an example of a distributed database to execute a query based on a range of hash values. FIG. 1 illustrates a computing system 100. Computing system 100 further comprises a distribute database 106. Distributed database 106 may be a distributed database such as a Vertica database in various examples.

Distributed database 106 comprises four database nodes, 108A, 108B, 108C, 108D (collectively "nodes 108")." Although illustrated as having four database nodes, distributed database 106 may comprise any number of database nodes. Each of nodes 108 includes a respective table partition 108A-108D. Nodes 108 further comprise a range of hash values 112A-112D that is associated (i.e. included or stored within) with each respective table partition 108A-108D.

As an example, the range of hash values associated with each of nodes 108A may be roughly divided into fourths such that when an entry having a particular hash value is stored, the odds of that key being stored in each node is uniform, i.e. roughly one fourth, dependent upon the hash function and data skew. Table partitions 110 store entries comprising a portion of the entire table stored by distributed database 106.

In accordance with the techniques of this disclosure, distributed database 106 may receive a database query 102. Distributed database 106 may receive database query 102 from a client. The client may comprise one or more nodes executing a distributed computing framework, such as Apache Spark, in various examples. The database query comprises a range of hash values 104. Range of hash values 104 may correspond to a range of hash values associated with a table partition stored by a database node. In the example of FIG. 1, range of hash values 104 is associated with range of hash values 112B, which is further associated with table partition 110B.

Responsive to receiving database query 102, database node 108B may determine that database query 102 includes range of hash values 104, and that range of hash values 104 is the same as range of hash values 112B, which is stored entirely by table partition 110B. Database node 108B further determines that database query 102 is requesting data from table partition 110B and not from any other table partitions of nodes 108, 108C, or 108D.

Responsive to database node 108B determining that database nodes 108A, 108C, and 108D do not contain any data associated with database query 102, database node 108B may generate an optimized global execution plan comprising a tree-like data structure. Based on the global execution plan, database node 108B may generate a distributed execution plan. Database node 108B executes the distributed execution plan against table partition 110B, and returns the results to the client, e.g. a node executing distributed computing framework.

Because database node 108 is able to determine that database nodes 108A, 108C, and 108D, do not store data requested by database query 102, database node 108B does not generate distributed execution plans for nodes 108A, 108C, and 108D. Therefore, nodes 108A, 108C, and 108D do not execute these distributed execution plans, which further eliminates unnecessary query processing on these nodes. Additionally, nodes 108A, 108C, and 108D do not return their distributed execution plan results to node 108B. Nodes 108A, 108C, and 108D do not return their results because they both have no results to return, and also because nodes 108A, 108C, and 108D do not ever receive distributed execution plans to execute. The elimination of distributed execution plan data shuffling to the initiator node, i.e. database node 108B, reduces bandwidth consumption.

Figure 2:
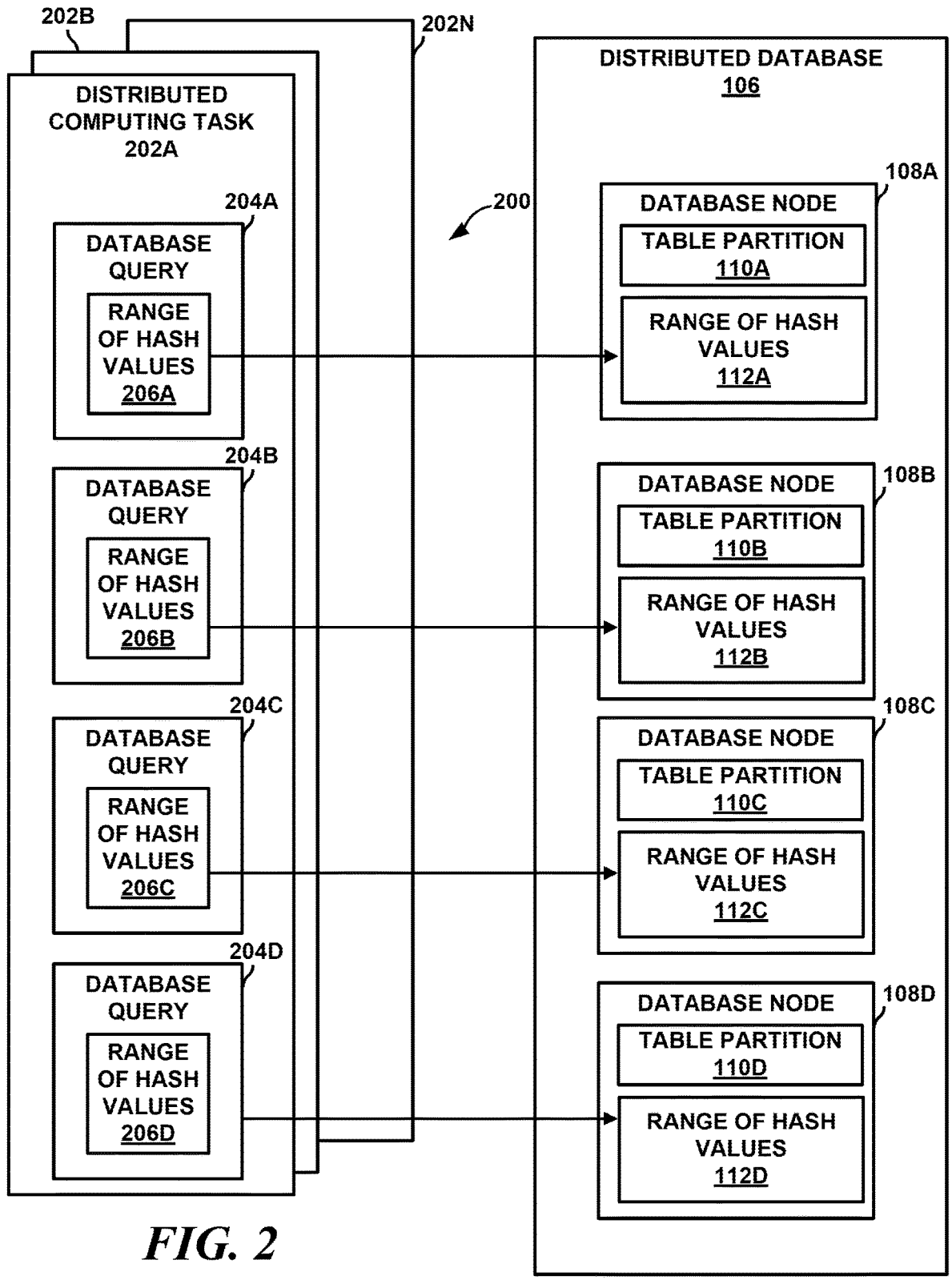
FIG. 2 is a conceptual diagram of an example of a distributed database to execute a query based on a range of hash values.

FIG. 2 is a conceptual diagram of an example of a distributed database to execute a query based on a range of hash values. FIG. 2 illustrates a computing system 200. Computing system 200 is generally similar to computing system 100 illustrated in FIG. 1 in that computing system 200 comprises distributed database 106, database nodes 108A-D, table partitions 110A-D, and ranges of hash values 112A-112D.

In addition, computing system 200 further comprises a number of distributed computing tasks 202A-202N ("distributed computing tasks 202"), where "N" is any number of tasks. Distributed computing tasks 202 execute using a distributed computing framework such as Apache Spark, MapReduce, or the like. Distributed computing tasks 202 may execute on a cluster of nodes executing the distributed computing framework.

In the example of FIG. 2, distributed computing task 202A has generated four database queries 204A-204D. Distributed computing task 202A has generated the four queries 204A-204D to correspond to each of the nodes 108A-108D of distributed database 106. By generating one database query per database node, the throughput of receiving the results of database queries 204 may be increased, for example. The throughput increase is due to each query having a separate connection, e.g. a JDBC connection to a database node. The multiple database node connections may provide additional bandwidth or throughput relative to using a single database connection.

Although computing system distributed computing task 202A is illustrated as having four database queries 204A-204D, distributed computing task 202A may generate more or fewer database queries. It should also be understood that in some examples, there may be a distributed computing task corresponding to each database node, and each distributed computing task, e.g. distributed computing tasks 202A-202N, may each generate a single database query having a range of hash values corresponding to each one of database nodes 108.

In various examples, distributed computing task 202A may query a database node, e.g. database node 108A to determine range of hash values 112A-112D. Database nodes 108 may include a table of meta-data that comprises ranges of hash values associated with each of table partitions 110 stored by each of nodes 108. The queried database node, e.g. 108A, may return the ranges of hash values to distributed computing task 202A. Based on the data retrieved from the meta-data table, distributed computing task 202A may then determine the range of hash values stored by each of table partitions 110A-110D, respectively.

Responsive to determining the range of hash values stored by each of nodes 108A-108D, distributed computing task 202A may generate database queries 204A-204D. Database queries 204A-204D may comprise range of hash values 206A-206D. Range of hash values 206A may correspond to range of hash values 112A stored by table partition 110A. Range of hash values 206B-206D may similarly correspond to ranges of hash values 112B-112D stored in table partitions 110B-110D, respectively. Thus a distributed computing task, such as distributed computing task 202A may determine a particular node storing a table partition corresponding to one of the retrieved hash arranges, may further generate a query that includes the hash range stored by that particular table partition, and may transmit the query to the database node storing the table partition.

In various examples, distributed computing task 202A may include hints in database queries 204A-204D. Each hint may indicate that a respective database query includes a range of hash values of a table partition stored by a database node. The hints may reduce the computation needed by the database node that receives the database query because that the database node may determine the hint is present, and then more quickly determine that the range of hash values is stored by the database node responsive to receiving the query with the hint. For example, query 204A may include a hint that range of hash values 206A corresponds to range of hash values 112A of table partition 110A.

In the example of FIG. 2, responsive to receiving database queries 204A-204D, each of database nodes 108A-108D determines that the query comprises a range of hash values 204A-204D, respectively. Database node 108A determines that ranges of hash values 204A is stored by table partition 110A, and not by any other database nodes, i.e. database nodes 108B-108D. Database nodes 108B make similar determinations with respect to database queries 204B-204D, i.e. that ranges of hash values 204B-204D are stored within table partitions 110B-110D, and not on any other nodes.

Responsive to determining that the range of hash values of database queries 204A-204D are stored by the receiving node and not by any other nodes, which a database node may determine based on any hints included with in the query, each of nodes 204A-204D may generate an optimized distributed execution plan includes that particular node. For example, database node 108A generates an optimized distributed execution plan of database query 204A, which will execute against table partition 110A. An executor of database node 108A then executes the optimized distributed execution plan against table partition 110A.

Because previous techniques did not allow database node 108A to quickly and/or efficiently determine whether a range of hash values matched a range of hash values stored by a table partition stored by a particular node, database node 108A would generate and send three distributed execution plans, one each to database nodes 108B-108D, which database nodes 108B-108D would execute. Database nodes 108B-108D would execute the three distributed execution plans unnecessarily and return an empty result. Each of database nodes 108B-108D would also generate unnecessary distributed execution plans for other database nodes. Thus, aspects of this disclosure reduce the unnecessary multiplicity of distributed execution plans, thereby reducing processor utilization and bandwidth consumption.

Figure 3:
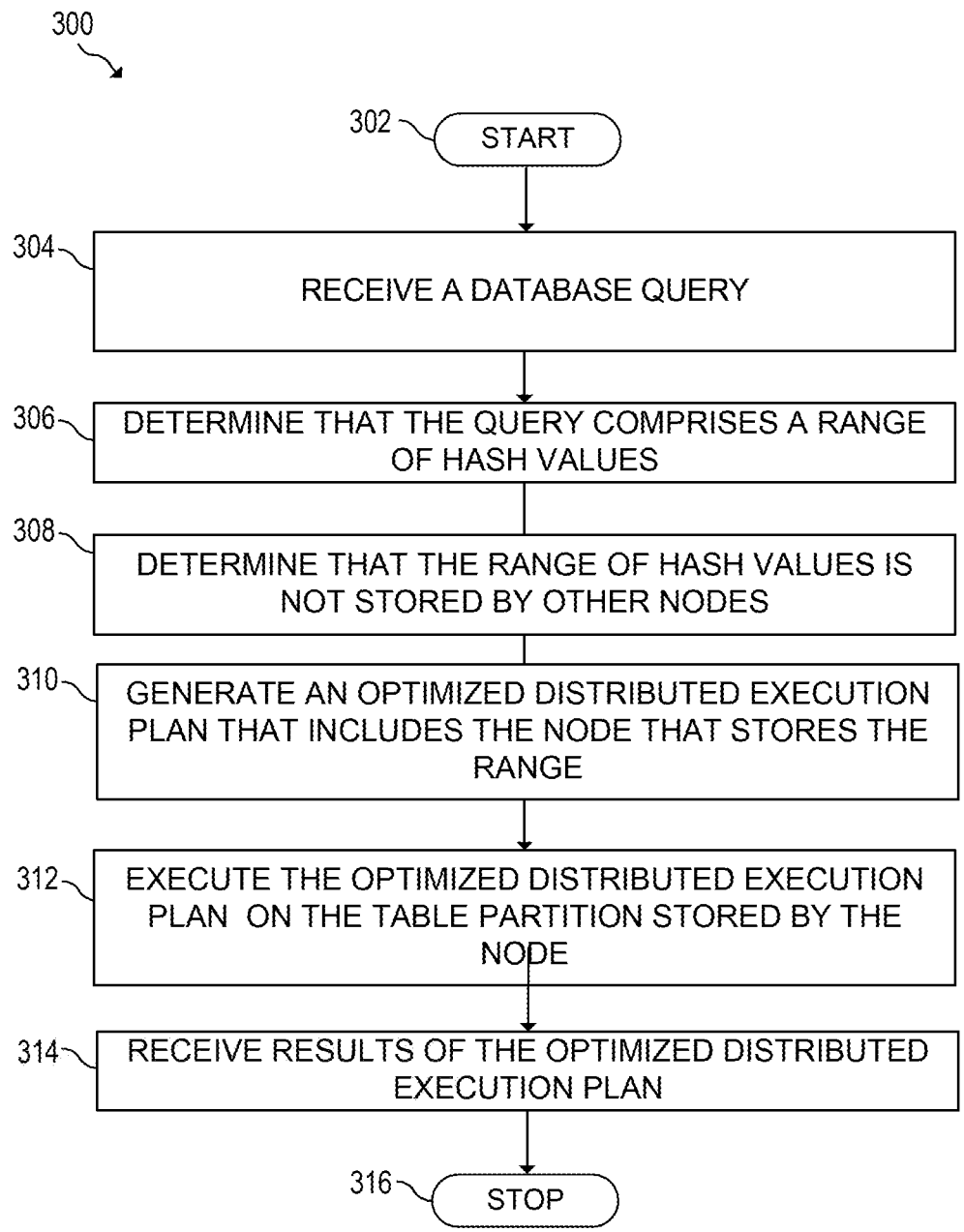
FIG. 3 is a flowchart of an example method for executing a query based on a range of hash values.

FIG. 3 is a flowchart of an example method for executing a query based on a range of hash values. Method 300 may be described below as being executed or performed by a system, for example, system 100 of FIG. 1 and/or system 200 of FIG. 2. In various examples, method 300 may be performed by an initiator node of a database, e.g. any of database nodes 108A-108D.

Other suitable systems and/or computing devices may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In alternate examples of the present disclosure, one or more blocks of method 300 may be executed substantially concurrently or in a different order than shown in FIG. 3. In alternate examples of the present disclosure, method 300 may include more or fewer blocks than are shown in FIG. 3. In some examples, one or more of the blocks of method 300 may, at certain times, be ongoing and/or may repeat.

Method 300 may start at block 302 and continue to block 304, where the system, e.g. one of database nodes 108, may receive a database query, e.g. database query 102. In various examples, a node executing a distributed framework, e.g. distributed computing task 202A may request hash ranges associated with each of the distributed database nodes, and receive the hash ranges associated with each of the distributed database nodes from one of the nodes, e.g. database node 108B. Distributed computing task 202A may determine a hash range of the received hash ranges that is stored by the database node, generate the database query based the hash range of the received hash ranges, and transmit the query to the node.

In various examples, distributed computing task 202A may include a hint in the query. The hint may indicate that the query comprises the range of hash values stored by the table partition of the database node, e.g. range of hash values 112B of table partition 110B.

The method may proceed to block 306 where database node 108B e.g., may determine that query 102 comprises a range of hash values 104 of a table partition, e.g. table partition 110B stored by a node, e.g. database node 108B, of distributed database 106. In various examples, the range of hash values may be included in an SQL syntax of the query.

Method 300 may proceed to block 308, where database node 108B may further determine that the range of hash values is not stored by other nodes, e.g. nodes 108A, 108C, or 108D, of distributed database 106. Responsive to determining that the range of hash values of the query is stored by node 108B, and not by the other nodes, the method may proceed to block 310.

Method 300 may proceed to block 310, where database node 108B may generate an optimized distributed execution plan that includes the node that stores the range of hash values and excludes the nodes that do not include the range of hash values. Method 300 may then proceed to block 312. At block 312, database node 108B may execute the optimized distributed execution plan on the table partition stored by database node 108B.

In various examples, method 300 may proceed to block 314 where a node executing a distributed computing framework, e.g. Apache Spark or the like, may receive the results of the optimized distributed execution plan. Method 300 may proceed to block 316, where method 300 may stop.

Figure 4:
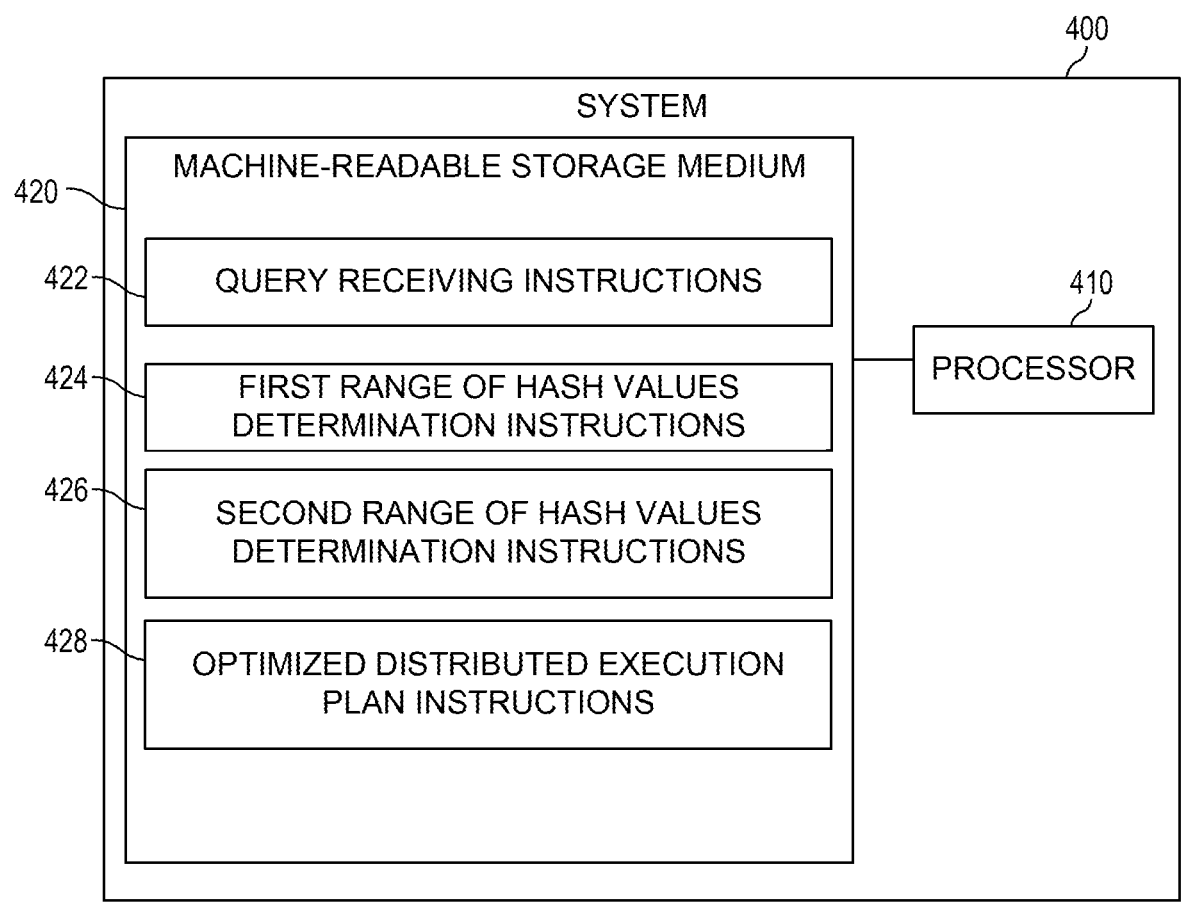
FIG. 4 is a block diagram of an example system for executing a query based on a range of hash values.

FIG. 4 is a block diagram of an example system for executing a query based on a range of hash values. In the example of FIG. 4, system 400 includes a processor 410 and a machine-readable storage medium 420. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 410 may be one or more central processing units (CPUs), microprocessors, and/or other hardware devices suitable for retrieval and execution of instructions stored in machine-readable storage medium 420. In the particular example shown in FIG. 4, processor 410 may fetch, decode, and execute instructions 422, 424, 426 to manage firmware of computing system 400. As an alternative or in addition to retrieving and executing instructions, processor 410 may include one or more electronic circuits comprising a number of electronic components for performing the functionality of one or more of the instructions in machine-readable storage medium 420. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 420 may be any electronic, magnetic, optical, or other physical storage device that stores executable instructions. Thus, machine-readable storage medium 420 may be, for example, Random Access Memory (RAM), an Electrically-Erasable Programmable Read-Only Memory (EEPROM), a storage drive, an optical disc, and the like. Machine-readable storage medium 420 may be disposed within system 400, as shown in FIG. 4. In this situation, the executable instructions may be "installed" on the system 400. Alternatively, machine-readable storage medium 420 may be a portable, external or remote storage medium, for example, that allows system 400 to download the instructions from the portable/external/remote storage medium. As described herein, machine-readable storage medium 420 may be encoded with executable instructions for generating and/or determining queries based on ranges of hash values.

Referring to FIG. 4, query receiving instructions 422, when executed by a processor (e.g., 410), may cause system 400. First range of hash values instructions 424, when executed by a processor (e.g., 410), may cause system 410 to determine that the query comprises a range of hash values of a table partition stored by a node of a distributed database. In various examples, the query may comprise a hint. The hint may indicate that the query comprises the range of hash values of the table partition.

Second range of hash values determination instructions 426, when executed by a processor (e.g., 410), may cause system 400 determine that the range of hash values is not stored by other nodes of the distributed database. Responsive to determining that the range of hash values of the query is stored by the node and not by the other nodes, processor 410 may execute optimized distributed execution plan instructions 428. Optimized distributed execution plan instructions 428, when executed, may cause processor 410 to generate an optimized distributed execution plan that includes the node that stores the range of hash values and excludes the nodes that do not include the range of hash values. In various examples, system 400 may include additional instructions. For example, machine-readable storage medium 420 may further include instructions that, when executed, cause processor 410 to execute the optimized distributed execution plan.

The invention claimed is:

1. A method for querying a distributed database comprising a plurality of nodes, the method comprising:
   receiving, at a first node of the plurality of nodes of the distributed database, a query that includes a particular range of hash values;
   determining, by a processor of the first node, that the particular range of hash values in the query is a same as a range of hash values of a table partition stored in the first node and is not the same as ranges of hash values of table partitions stored in other nodes of the distributed database;
   responsive to the determination that the particular range of hash values in the query is the same as the range of hash values of the table partition stored in the first node and is not the same as the ranges of hash values of the table partitions stored in the other nodes, generating, by the processor of the first node, an optimized distributed execution plan that includes only the first node and excludes the other nodes from executing the optimized distributed execution plan; and
   executing, by the processor of the first node, the optimized distributed execution plan on the table partition stored in the first node to generate data requested by the query, without sending the optimized distributed execution plan to the other nodes for execution.

2. The method of claim 1, further comprising:
   requesting, by a task node, the ranges of hash values of the plurality of nodes;
   receiving, at the task node, the ranges of hash values from the plurality of nodes;
   determining, by the task node, the range of hash values of the first node to be the particular range of hash values for the query;
   generating, by the task node, the query based the particular range of hash values; and
   transmitting, by the task node, the query to the first node.

3. The method of claim 2, wherein the task node executes a distributed computing framework.

4. The method of claim 1, further comprising:
   transmitting, by the processor of the first node, the data generated from the execution of the optimized distributed execution plan to a client device that sent the query.

5. The method of claim 1, wherein the particular range of hash values is included in a structured query language (SQL) syntax of the query.

6. The method of claim 1, wherein the query further comprises: a hint that indicates the query comprises the particular range of hash values.

7. The method of claim 1, wherein the first node is an initiator node of the distributed database.

8. A computing system comprising:
a processor; and
a memory storing instructions that when executed cause the processor to:
receive a query that includes a particular range of hash values;
determine that the particular range of hash values in the query is a same as a range of hash values of a table partition stored in a first node of a plurality of nodes of a distributed database and is not the same as ranges of hash values of table partitions stored in other nodes of the distributed database;
responsive to the determination that the particular range of hash values in the query is the same as the range of hash values of the table partition stored in the first node and is not the same as the ranges of hash values of the table partitions stored in the other nodes, generate an optimized distributed execution plan that includes only the first node and excludes the other nodes from executing the optimized distributed execution plan; and
execute the optimized distributed execution plan on the table partition stored in the first node to generate data requested by the query, without sending the optimized distributed execution plan to the other nodes for execution.

9. The computing system of claim 8, wherein the query is received from a task node.

10. The computing system of claim 9, wherein the task node executes a distributed computing framework to generate the query.

11. The computing system of claim 10, the task node executing the distributed computing framework further to:
request the ranges of hash values of the plurality of nodes;
receive the ranges of hash values from the plurality of nodes;
determine the range of hash values of the first node to be the particular range of hash values for the query;
generate the query based on the particular range of hash values; and
transmit the query to the first node.

12. The computing system of claim 10, wherein to generate the query, the task node executing the distributed computing framework to include a hint in the query, wherein the hint indicates the query comprises the particular range of hash values.

13. A non-transitory computer-readable storage medium including instructions stored thereon that, when executed, cause a processor to:
receive a query that includes a particular range of hash values;
determine that the particular range of hash values in the query is a same as a range of hash values of a table partition stored in a first node of a plurality of nodes of a distributed database and is not the same as ranges of hash values of table partitions stored in other nodes of the distributed database;
responsive to the determination that the particular range of hash values in the query is the same as the range of hash values of the table partition stored in the first node and is not the same as the ranges of hash values of the table partitions stored in the other nodes, generate an optimized distributed execution plan that includes only the first node and excludes the other nodes from executing the optimized distributed execution plan; and
execute the optimized distributed execution plan on the table partition stored in the first node to generate data requested by the query, without sending the optimized distributed execution plan to the other nodes for execution.

14. The non-transitory computer-readable storage medium of claim 13, wherein the query comprises a hint indicating the query comprises the particular range of hash values.

15. The non-transitory computer-readable storage medium of claim 13, further including instructions stored thereon that, when executed, cause the processor to:
transmit the data generated from the execution of the optimized distributed execution plan to a client device that sent the query.

16. The non-transitory computer-readable storage medium of claim 13, wherein the query is received from a task node of the distributed database, and wherein the task node executes a distributed computing framework to:
request the ranges of hash values of the plurality of nodes;
receive the ranges of hash values from the plurality of nodes;
determine the range of hash values of the first node to be the particular range of hash values for the query;
generate the query based on the particular range of hash values; and
transmit the query to the first node.

17. The non-transitory computer-readable storage medium of claim 13, further including instructions stored thereon that, when executed, cause the processor to:
transmit the data generated from the execution of the optimized distributed execution plan to a client device that sent the query.

* * * * *